Figure 5:
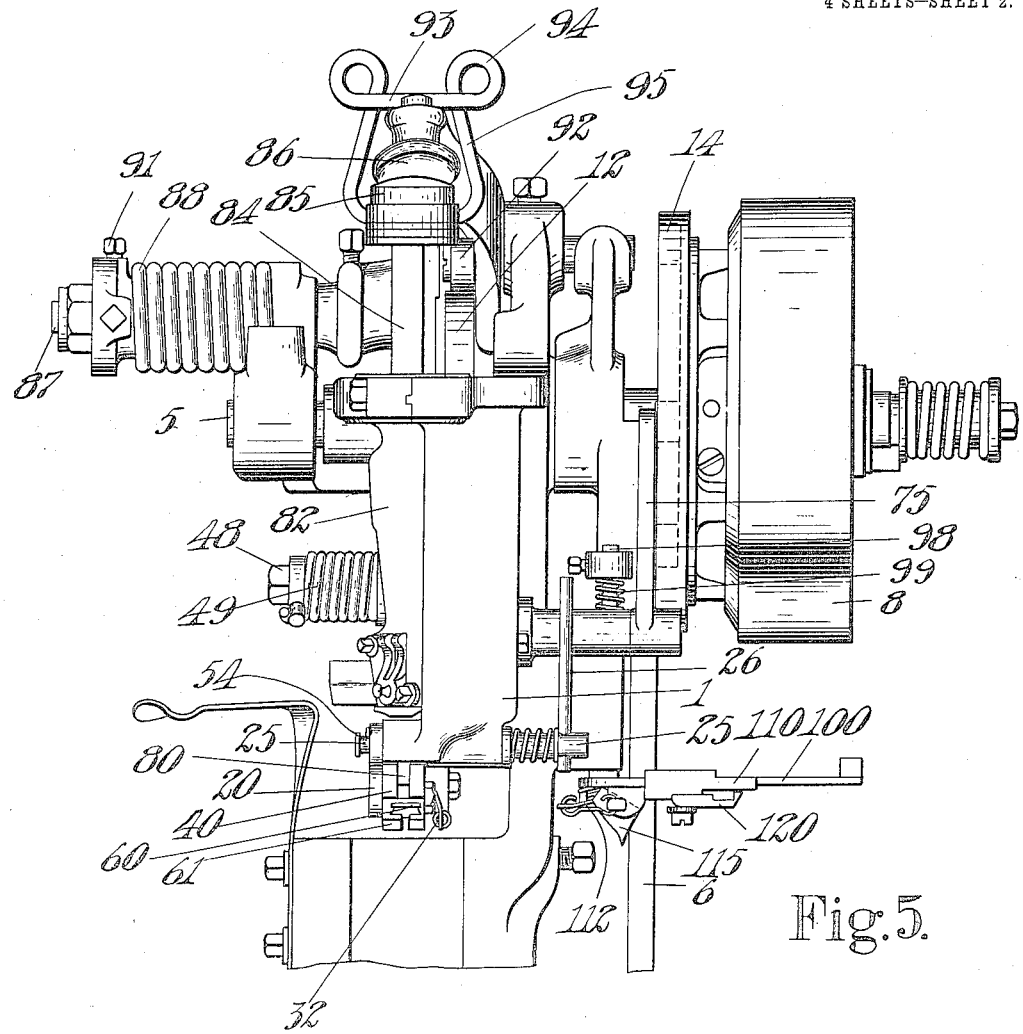

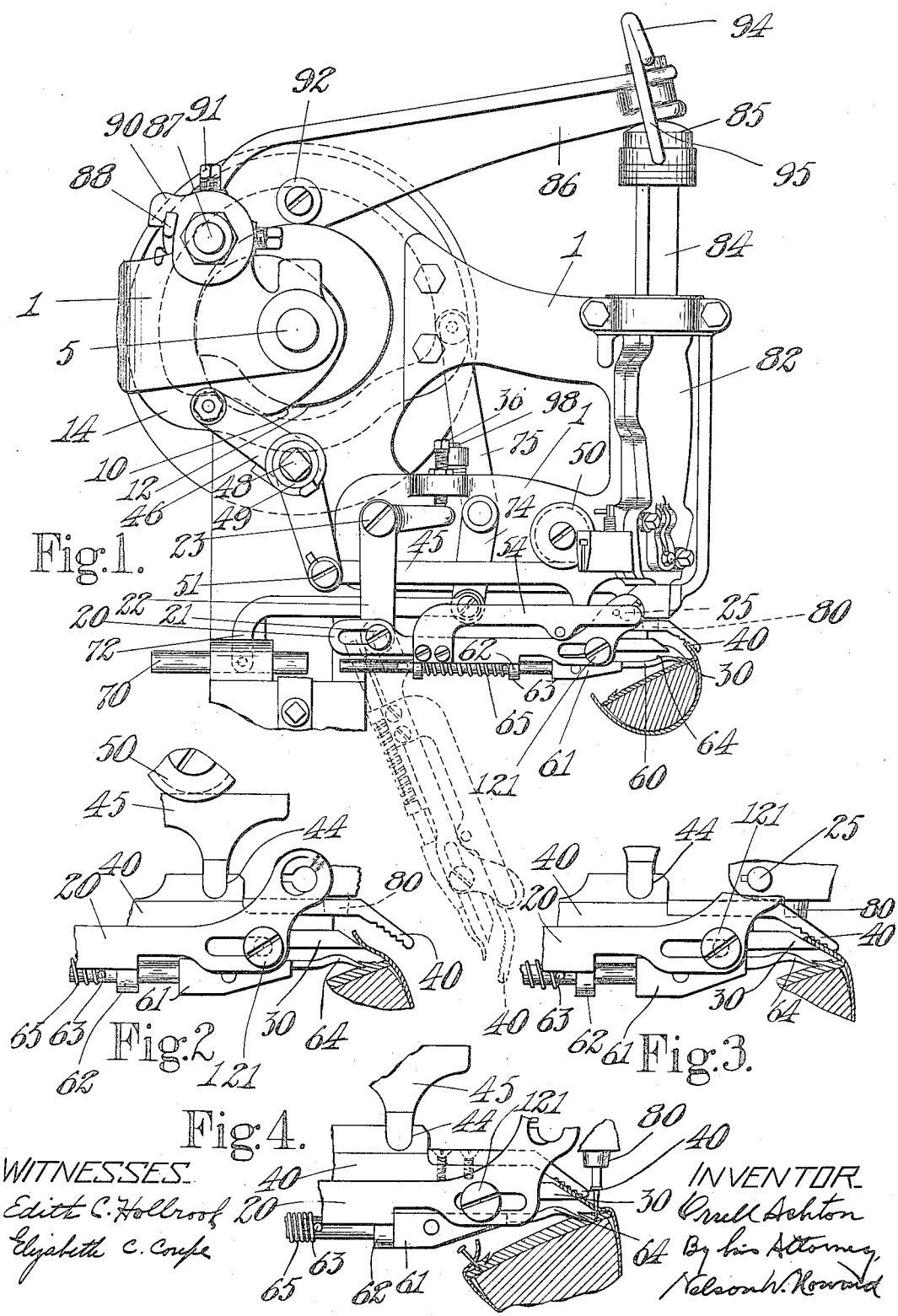

O. ASHTON.
MACHINE FOR USE IN THE MANUFACTURE OF BOOTS AND SHOES.
APPLICATION FILED APR. 6, 1910.

1,050,904.

Patented Jan. 21, 1913.

4 SHEETS—SHEET 2.

WITNESSES.
Edith C. Holbrook
Elizabeth C. Coupe

INVENTOR
Orrell Ashton
By his Attorney,
Nelson A. Howard

UNITED STATES PATENT OFFICE.

ORRELL ASHTON, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,050,904.  Specification of Letters Patent.  Patented Jan. 21, 1913.

Application filed April 6, 1910. Serial No. 553,833.

*To all whom it may concern:*

Be it known that I, ORRELL ASHTON, a citizen of the United States, residing at Swampscott, in the county of Essex and State of Massachusetts, have invented certain Improvements in Machines for Use in the Manufacture of Boots and Shoes, of which the following description, in connection with the accompanying drawings, is a specification, like reference characters on the drawings indicating like parts in the several figures.

This invention relates to machines for use in the manufacture of boots and shoes.

A general object of this invention is to improve shoe stock manipulating and fastening apparatus.

A more particular object for which the illustrated embodiment of the invention has been designed is to provide a machine for use in preparing the shoe for the operation of such a pulling over and toe lasting machine as that shown in my co-pending application Serial No. 527,210, and for doing any further lasting and tacking that may be desired to complete the preparation of the work for the shoe sewing operation in which the upper and sole, or insole and welt, are permanently secured together.

With these objects in view the machine with reference to which the invention will be explained comprises a gripper and a tacker which can be used with the gripper for lasting operations and can also be used without the gripper for shoe assembling and other operations.

This invention is shown as embodied in a machine in which the gripper is arranged to extend transversely across the shoe bottom to engage the upper on the side of the shoe more remote from the machine frame and in which operating mechanism is provided to move the gripper inwardly for pulling the upper toward the machine. With this arrangement the shoe is located between the gripper jaws and the body of the machine and the working point is on that side of the shoe which is adjacent to the operator so that he can clearly see the progress and the result of the upper pulling operation.

A feature of this invention consists in the organization of a lasting machine having a gripper arranged and operating as above described with a shoe rest which is adapted to resist all of the upper stretching strain of the gripper and thereby relieves the workman of a laborious element of a lasting machine operator's work. The shoe rest is shown as arranged to engage the shoe bottom between the gripping point and the body or frame of the machine and as I am advised it is new with me to provide a sole rest which is located between the body of the machine and the gripping point and is adapted to resist the overdraw strain in the lasting operation. It is also believed to be new to employ a sole bottom rest with a gripper which is arranged and operates transversely of the shoe from the outer side of the shoe inwardly as above described.

A further feature of this invention consists in the organization of a lasting machine which permits or causes the gripper after seizing the upper to transfer the shoe into tack receiving relation to the tacker and then to pull the upper and hold it under tension while the tack is driven. This feature has the advantage that a stationary tacker may be employed and the machine simplified because no tacker moving mechanism is required.

A further feature of the invention consists in mounting the shoe rest, which may advantageously be arranged to engage in the outwardly and downwardly inclined channel incision of the sole, to project normally into a shoe receiving position in which a shoe may conveniently be applied thereto, and then to be moved into its shoe resting position. This mounting facilitates the presentation of the shoe to the rest and enables the rest to guide the shoe into operative relation to other instrumentalities of the machine. Preferably the rest will be mounted so that by adjustment or otherwise it may be made to project with relation to the lower or inner gripper jaw and so that it can yield to pressure for guiding the upper materials into the jaws of the gripper. After the jaws close, as herein shown, they move inwardly and carry the upper and, through the shoe, the rest backwardly until the movement of the rest is interrupted by an abutment between which and the rest there is relative adjustment to determine the position of the shoe relatively to the tacker. After the grippers, having transferred the shoe to tacking position, have continued their movement to pull the upper a tack is driven while the grippers continue to hold the upper. Thereafter, in accordance with a further feature of this invention the sole rest is actuated to move the shoe outwardly in unison with the outward or return movement of the jaws. Preferably the rest is so moved unyieldingly and through the same distance as the lower gripper jaw is outwardly moved. This arrangement removes all liability of the lower jaw loosening the tack which has been driven.

The gripper jaws are shown as slotted or forked to permit the nozzle of the tacker to project into desired relation to the plane of the shoe bottom and preferably the sole rest or the gripper, or both, form spacing means to hold the shoe away from the nozzle and from the lower limit of the driver path to insure a predetermined partial insertion of the lasting tacks which are later to be pulled out.

A further feature of this invention consists in mounting the gripper removably in its working position so that it can be shifted relatively to the tacker into a position to permit the use of the tacker alone. Provision is also preferably made for interrupting operative connection between the gripper and its actuating mechanism when the gripper is shifted into non-working position, so that the gripper remains at rest. The relatively movable parts of the gripper are locked automatically against relative displacement when the gripper is moved to its non-working position and are thus maintained in conditions for reëstablishing operative connection with the actuating mechanism when the gripper is returned to working position.

When the tacker is to be used without the gripper and sole rest for inserting upper holding tacks which must later be pulled out other means is employed in accordance with a feature of this invention for serving the work-spacing function which the gripper or the sole rest, or both, serve when in their operative positions. The tacks which it is contemplated will be inserted while the gripper is idle include those located at the ends of the heel stiffener and those shoe assembling tacks which are located in the heel seat face and the end face of the shoe at the rear of the heel. The tack that is driven into the rear end face of the heel should be left outstanding only a little while the other tacks mentioned may be left upstanding to a greater extent and thereby rendered easier to pull. In view of these conditions means is provided in accordance with this invention for spacing the shoe at different distances from the tacker to cause the tacks to be left upstanding different distances. This means herein includes spacing plates movable into coöperating and preferably interlocking relation to the tacker, one of which may be movably mounted upon the other. There is also provided a stock bending device to coöperate with the thicker spacing plate in heel seat tacking. This device is formed to bend the heel stiffener and upper materials at an oblique angle over the edge of the shoe bottom and hold them while the temporary tack is driven to hold the stock ready for the permanent fastening.

These and other features of this invention will more fully appear in connection with the following description of a preferred embodiment of the invention and will then be pointed out in the claims.

Figure 6:
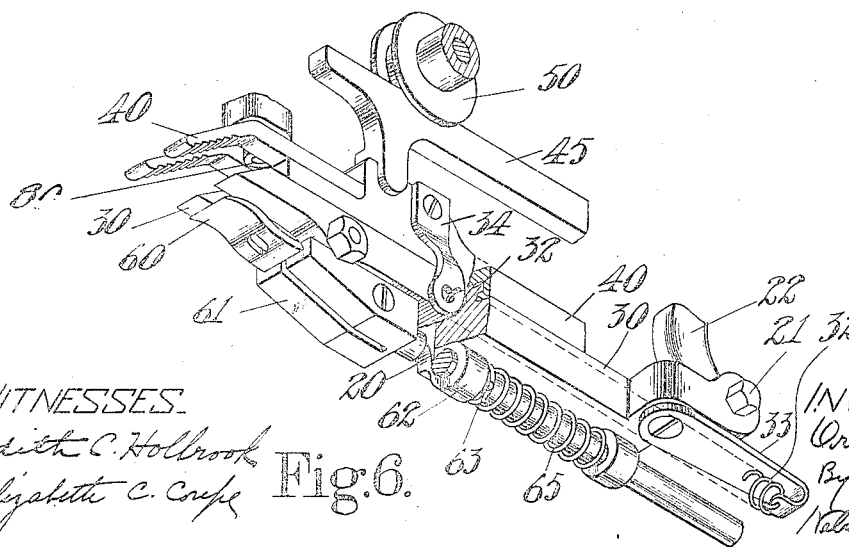
Figure 7:
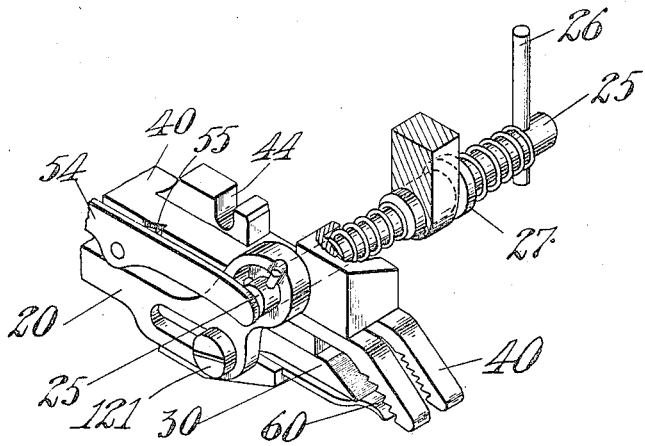
Figure 8:
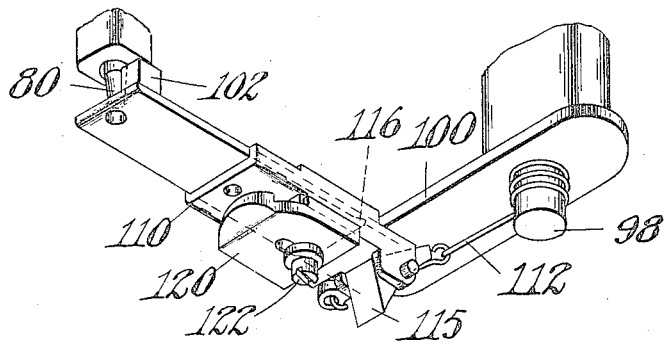
Figure 9:
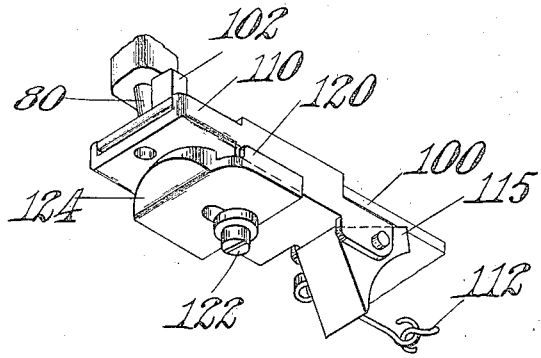
Figure 10:
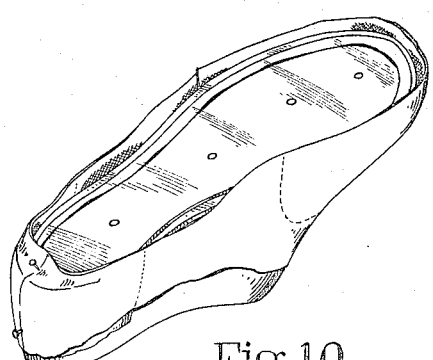
Figure 11:
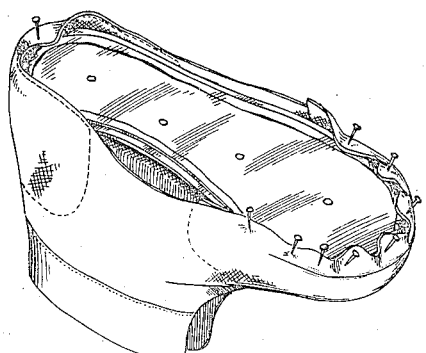
Figure 12:
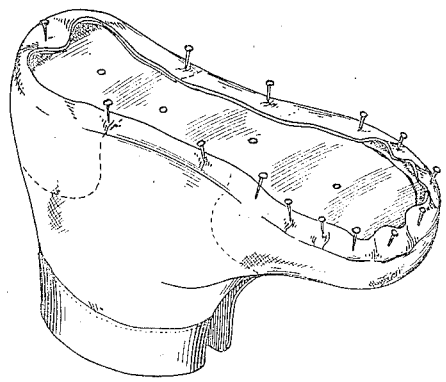

Figure 1 is a side elevation of the machine, the gripper and sole rest being shown by full lines in their working position and by dotted lines in non-working position. A shoe is shown in section in the position in which it is presented to the yieldingly mounted sole rest. Fig. 2 is a detail showing the gripper and the sole rest with a portion of a shoe pressed against the rest to move the rest inwardly and guide the shoe into position for the gripper to be closed upon the upper. Fig. 3 shows the same parts when the gripper has closed and begun to pull. Fig. 4 represents the same parts when the sole rest has abutted against its stop, and the gripper continuing its movement has completed its pull and the tack is being driven. Fig. 5 is a front elevation of the machine. Fig. 6 is a perspective view of the gripper and sole rest. Fig. 7 is a perspective view of the gripper and sole rest from a different angle and shows details of the locking bolt by which those parts are supported and retained in operative position. Figs. 8 and 9 are details of the spacing or work positioning devices which are arranged for use alternatively with the gripper and sole rest, Fig. 9 showing the thicker spacing block and the stock bending device in working position. Fig. 10 shows a small turn shoe assembled on a last by the aid of the present machine, the sole being tacked to the last bottom and the upper materials tacked to the end face of the last at the back seam, to fix the vertical position of this portion of the shoe relatively to the last, and bent over upon the heel seat and tacked to the rear end of the sole to secure those parts in relative position. Fig. 11 shows the shoe after it has been pulled over and the toe lasted. Fig. 12 shows the sides of the shoe lasted by the machine of this invention and the shoe ready for the sewing operation by which the sole and the upper materials are permanently united.

The frame 1 of the machine provides support for the upper pulling devices and for the tacking devices and has bearings for a shaft 5. The shaft is connected with a continuously running pulley 8 by a one revolution clutch of known construction, which is controlled by a rod 6 and a treadle not shown. The shaft carries a gripper operating cam 10, a driver lifting cam 12 and a sole rest controlling cam 14.

The gripper carrier 20 is an angle plate having a vertical edge wall and a bottom wall and is supported at its rear end by a pin and slot pivotal connection 21 with an arm 22 which is pivoted at 23 to the frame. The front end of the gripper carrier is supported, with the gripper in operative position, by a bolt 25 which can be withdrawn toward the right in Fig. 5 to allow the gripper mechanism to swing down into the inoperative position shown in dotted lines in Fig. 1 at such times as it may be desired to employ only the tacking devices of the machine.

The bolt 25 has on its left hand end a stud, Figs. 5 and 7, which engages an annular cam face on the gripper carrier to clamp the carrier firmly against the machine frame when the bolt is turned in one direction by its handle 26. The bolt is encircled at its right hand end by a stiff spring which is under compression between the handle 26 and a collar 27 which abuts against a portion of the frame 1, Figs. 5 and 7. This spring tends to force the stud on the left hand end of the bolt in its seat in the cam face on the gripper carrier and to clamp the carrier firmly against the frame. When the bolt 25 is reversely turned from its position, Fig. 7, the stud is dislodged from its seat in the cam face of the gripper carrier and is brought into alinement with a recess that is cut through the carrier and into the frame and which permits withdrawal of the bolt. This allows the gripper mechanism and the sole rest to swing about the pin at 21 into dotted line position, Fig. 1, and leaves the tacker nozzle exposed as in Figs. 8 and 9. A second spring of light tension and greater expansibility for drawing the bolt into the frame is arranged between the frame and the end of a sleeve which slides in the frame and abuts against a shoulder on the bolt. The collar 27 is conveniently formed on this sleeve.

The gripper comprises an upper jaw and a lower jaw, the gripping face of which latter is formed by the beveled end of a horizontally arranged bar 30. This bar is movable endwise in the gripper carrier and has ears at its rear end through which extends the pivot bolt 21, see Fig. 6. The bar and therefore the lower jaw, is pressed forwardly by a spring 32 which extends under tension for closing the jaws from a clip 33 secured to the rear end of the bar, Fig. 6, to a clip 34 attached to the upper jaw. This forward movement of the lower jaw by the spring 32 is limited by slots in the rear and front portions of the gripper carrier, Fig. 1, through which the bolt 21 and a headed guide screw 121 extend respectively. This movement may be further limited by the adjusting screw 36, Fig. 1, which is arranged in the frame to engage a forwardly projecting arm of a rockshaft to which the arm 22 carrying the bolt 21 is rigidly secured. By setting the screw the normal position of the jaw bar 30 is regulated and thereby the width of opening of the gripper jaws determined as will later appear.

The upper jaw of the grippers is formed on or removably attached to an endwise sliding bar 40 which has a tongue and groove sliding connection with the top face of the lower jaw bar 30, see Fig. 6. This bar has on its upper side a boss provided with a seat 44 for the head of its operating bar 45 by which the upper jaw is moved first to grip the stock against the lower jaw and then, by force transmitted from the upper jaw through the stock, the lower jaw is moved backwardly with the upper jaw to pull the upper relatively to the last which is held by the back rest 60 as shown in the progressive views, Figs. 2, 3, and 4. This motion is transmitted to the operating bar from the cam 10 by a lever 46 which is fulcrumed on a stud 48 which is rigidly fixed in the frame and has a roll standing against the edge of the cam block. The fulcrum stud 48 for this lever is encircled loosely by a strong coiled spring 49, one end of which is fastened to the stud and the other end of which acts torsionally against the lever 46 in the direction to close the gripper jaws. The operating bar 45 is guided under an idler roll 50 and it is held up against that roll when the gripper mechanism is turned down into the dotted line position, Fig. 1, by a spring 51 which encircles the bolt 21 and underlies the bar as in full lines, Fig. 1.

A spring plate 54 attached to the gripper carrier 20 and having a tooth 55 engages a notch in the side of the upper jaw bar 40, Fig. 7, to lock that bar against backward movement by the spring 32 when the bolt 25 is withdrawn. This spring plate is pressed away from bar 40 by the bolt 25 to permit operative movements of the jaw while the gripper is in use and the plate automatically reëngages the bar when the bolt is retracted. This latch plate not only prevents the jaws from closing while the gripper hangs down, Fig. 1, but it maintains the operating bar seat in bar 40 in longitudinal position for reëngaging the operating bar when the gripper is returned to working position.

The rest 60 which is arranged to engage the sole of the shoe to resist the backward pull of the gripper is adjustably mounted by a split holder 61 and a clamping screw, Fig. 6, on a rod which slides endwise in bearings 62 on the lower side of the gripper carrier 20 and the rest is normally pressed forwardly by a spring 65 acting against one of said bearings and against a stop pin 63. The rest has a downwardly inclined blade-shaped end to enter readily the oblique incision or channel of a turn shoe sole or the corresponding formation of a welt shoe innersole. The end portion of the rest 60 between the rod and the blade is bowed upwardly as at 64, Fig. 3, to give clearance for the sole and opportunity to tip the shoe as may be required in presenting different portions of it to the operation of the machine.

The sole rest normally projects forwardly into a position relative to the grippers which enables the operator readily to present the shoe properly thereto and to feed the shoe from one working point to the next. The rest may be then pressed backwardly by the shoe in the act of sliding the upper into the jaws of the gripper. This rest serves as a guide for the upper in this insertion into position to be gripped and it also presses downwardly and outwardly the marginal portion of the sole and holds it in place to have the upper pulled over and tacked to it. The sole rest has a range of free backward movement against its spring 65 that is measured by the distance between its bearing 62 and the rear face of the holder 61, Figs. 1 to 4. As the grippers pull backwardly they move the shoe, together with the sole rest, until the holder abuts against the bearing as in Fig. 4. This movement of the shoe carries it under the stationary tacker nozzle 80 and into position to receive the fastening tack while the upper is being initially pulled or straightened over the last and before the final upper tightening pull is effected. Thereafter the rest becomes fixed and the grippers pull the upper to stretch it over the last with a force determined by the tension of the pulling spring 49 and the holding spring 32.

The sole rest not only constitutes the work guide along which the shoe may be moved in feeding for side lasting but also it adjustably regulates the distance from the edge of the shoe at which the tacks shall be driven. This is important for in making turn shoes the tacks should always be driven into the "between substance" which is located intermediate the shoulders and the lip 1 of the sole, Fig. 3. In this position they obtain the greatest holding engagement with the sole without going through the sole and making a stain on the face side of the sole after the shoe is turned, and also they are out of the way of the channel guide of the sewing machine which would be interrupted by them if the tacks were driven into the lip. It should be observed that in accordance with this embodiment of the invention the machine, acting through the gripper and the sole rest, automatically moves the shoe into a predetermined lateral relation to the tacker for the insertion of each tack.

It is desirable that the sole rest follow the grippers in their reverse movement after the tack has been driven in order to insure that the shoe moves outwardly ahead of the lower gripper jaw which might otherwise tend to tear out the tack just driven. The sliding sole rest abutment 70 is therefore provided, Fig. 1, which is guided in bearings in the frame and is connected with the cam 14 by a link 72 and by a lever or rock-shaft which has offset arms 74, 75. The track in the cam is cut relatively to the gripper cam to give the abutment a forward stroke with the gripper return movement and then to retract the abutment as in Fig. 1 before the machine comes to rest.

The jaws 30 and 40 are preferably slotted to receive the nozzle 80 which, with this arrangement, may be vertically stationary. The tack driving mechanism of which the nozzle is a part is supported upon the forwardly projecting portion of the frame and comprises a casing 82 in which is movable the driver bar 84 which is provided at its upper end with a head 85 that is arranged to be engaged by the outer end of the lever 86 fast on the rod or axle 87. A coiled spring 88 encircling said axle has one end hooked over a portion of the frame at 89 and the other end fastened to a flange 90 of a sleeve that is held by a binding screw 91 in angularly adjusted position on the axle with the spring 88 under tension to actuate the driver lever downwardly. A roll 92 on the lever rests upon the driver lifting cam 12 which is in appropriate form to let the driver lever and bar descend abruptly to insert a tack by impact. The driver lever is flexibly connected to the driver bar for lifting the latter by a resilient device shown best in Fig. 5 and comprising the cross bar 93, the upturned spring eyes 94 and the depending arms 95 having inturned lower ends which hook into recesses in the driver head 85 to raise the latter. Tacks are supplied as herein shown from a tack strip which is automatically advanced in time relation to the movements of the driver by usual means such, for example, as that described in United States Letters Patent No. 483,375. The shoe rest and the grippers are so positioned relatively to the nozzle that the tacks which are driven to fasten the upper temporarily in lasted position are left upstanding or only partially driven to facilitate pulling them out after the shoe is sewed.

In the use of the machine built as above described, to embody the present invention, a shoe is supported bottom upwardly, preferably in the hands of the operator, the sole is pressed against the rest 60 which may enter the channel or engage the lip of the sole or innersole and the upper on that side of the last which is toward the operator is inserted between the open jaws as in Fig. 2. With the work thus presented, the shoe will be forced backwardly against the yielding sole rest, or toward the machine, more or less according to the length of grip it is desired to obtain on the upper. The starting treadle is then depressed to pull down the clutch rod 6 and start the machine. The jaw bar 40 is first moved in its horizontal path to grip the upper against the jaw 30 which then begins to slide backwardly whereby the upper is pulled with a force determined by the tension of the spring 62 against which the sole rest yields backwardly to allow the shoe to follow the gripper. This initial upper pulling and shoe transferring movement shifts the upper and the last into tack receiving position under the tacker nozzle, Fig. 4. After this position of the shoe is reached the further movement of the grippers backwardly gives the final upper tightening effect and then the driver cam releases the driver to insert a tack as shown in Fig. 4. Immediately thereafter the return movement of the gripper jaws is commenced and with it begins the advance of the sole rest actuating plunger 70 by which to insure the movement of the shoe outwardly in time relation with the return of the lower jaw 30 to shoe receiving position.

It is sometimes desirable to insert tacks without crowding back the sole rest and for this purpose an oblong slot, Fig. 6, is formed in the rest under the nozzle. This slot allows a tack to be driven through the rest in different adjusted positions of the rest within its holder. This slot also prevents liability of injury to the rest by the tack or driver if the machine is run idly through its cycle.

The machine may be used without the grippers with the nozzle 80 bare for heelseat tacking and other surface nailing operations such as tacking the sole to the last bottom but when inserting such assembling and lasting tacks as are later to be pulled the tacks are advantageously inserted only partially so that their subsequent removal is rendered easier and for this purpose gaging devices are provided to space the shoe away from the nozzle as the gripper and sole rest do when they are in operative position. A post 98 at the right hand side of the machine head, Fig. 1, is yieldingly upheld by a spring 99 and supports an angular plate 100 which is capable of turning from the inoperative position shown in Fig. 5, where it is out of the way of the gripper, into a position in which its free end is located under the tacker as shown in Figs. 8 and 9 where it will limit the approach of the work to the nozzle and to the lower limit of the driver stroke thereby insuring partial insertion only of the tacks. A stop 102 on the side of the gage 100 contacts with the nozzle and with the under face of the tacker head and limits movement of the gage. The gage has an opening which allows it to fit up over the nozzle far enough to lock the gage in position and the yielding post 98 and, it may be, the resilience of the plate itself causes the gage to snap up and lock automatically upon the nozzle. To obtain greater exposure of the driven tack a spacing block 110 is mounted to slide along the lower face of the front arm of the gage plate. This block is normally held backwardly as in Fig. 8 by a spring 112 and has a spring latch 115 adapted to snap into a notch 116 in the plate when the block is pulled forwardly into Fig. 9 position. This latter position is particularly intended for inserting an assembling tack through the upper and heel stiffener into the sole at the rear end of the heel seat. This tack holds these parts of the shoe relatively to each other and to the last for the pulling-over operation and to facilitate bending down the heel stiffener into position to receive this heel seat assembling tack a bender 120 is adjustably attached to the block 110 by a bolt 122 and is provided with a beveled stock bending face 124. This bender also serves as a back gage to insure positioning of the heel seat tack outside the channel, for shoes that are sewed all the way around as is sometimes done, so that the tack will not constitute an obstruction for the channel guide of the sewing machine.

In the contemplated use of the machine the sole will first be tacked to the last bottom by the use of the tacking mechanism with the nozzle bare because it is desirable to drive the sole fastening tacks fully into the work. Then when the upper materials have been applied to the last and adjusted the plate 100 will be swung around to operative position as in Fig. 8 where it snaps under the nozzle and the back seam tack will be driven. Then by releasing the latch 115 the thicker spacing block 110 is advanced and with it the bending device 120, as in Fig. 9. The shoe is then presented against these devices for the insertion of the heel seat assembling tack. It is the usual practice to perform each operation, as, for example, the sole tacking operation, the assembling operation, etc., upon several shoes as a dozen or a case in succession and then to proceed with the succeeding operation upon the same lot of shoes. This course may advantageously be followed in the use of the present invention and the soles tacked on the lasts for a lot of the shoes and then the machine adjusted to perform the assembling operation on the same shoes. The shoe in the condition represented in Fig. 10 is now ready for the pulling-over and toe lasting machine. After it is returned from that machine in the condition shown in Fig. 11 the spacing devices of Figs. 8 and 9 are returned to inoperative position, Fig. 5, and the gripper and sole rest are turned up from the dotted line position, Fig. 1, to the full line position and the bolt 25 pressed through the eye in the gripper carrier 20 and turned to clamp the carrier against the machine frame and to lock itself by its stud in its seat in the carrier. As the gripper is raised the seat 44 in the top of bar 40 is fitted over the depending arm of the bar operating member 45 and when the bolt 25 is inserted through the carrier it presses the latch 54, 55 out of holding engagement with bar 40, Fig. 7, so that that bar is free to be moved by the operating member 45 and the spring 32. The shoe is now presented to the machine for side lasting, as in Fig. 1, the sole being pressed against the rest 60 so that the thin end will enter the channel incision or abut against the channel lip if the lip is upturned. The shoe is then pressed inwardly toward the frame or body of the machine until the upper is guided into the jaws or into such relation, Fig. 2, to the lower jaw 30, that it will be gripped thereagainst when the upper jaw moves inwardly. The machine is then started by the usual foot treadle or otherwise and after the jaw 40 has gripped the stock against jaw 30 it moves the jaw 30 with it inwardly, Fig. 3. During a portion of this movement the sole rest also yields inwardly until the enlarged holder 61 strikes the bearing 62, Fig. 4, whereupon the rest becomes a fixed abutment for the shoe and a stop relatively to which the gripper in its continued movement pulls the upper. At the end of the inward stroke of the gripper the tack driver is released and the tack driven as in Fig. 4, being left upstanding to an extent determined by the distance from the lower end of the driver path to the sole rest, or to the lower face of the jaw 30 if the rest were not present. In the movement of the shoe and the rest together by force transmitted from the grippers through the upper, the shoe is positioned relatively to the tacker and by adjusting the rest 60 in its holder 61 the relation of the tacking line to the channel and the edge of the sole can be varied. After the tack is driven the sole rest is positively moved outwardly by its actuating means in company with the gripper movement into shoe receiving position, so that there is no liability of the tack being disturbed by the advance of the lower jaw. The extent of the movement of jaw 30 is regulated by screw 36. The movement of jaw 40 is continued far enough to insure a wide opening under it through which the partially inserted or upstanding tack can pass freely as the shoe is moved lengthwise in contact with the sole rest to present the next pulling point to the jaws. The operation is then repeated. The movable sole rest is located in such relation below the jaw 30 that the shoe can be canted or tipped about the rest as a fulcrum downwardly in presenting a shoe to position a short upper where it can be gripped by the jaws, and upwardly or downwardly during the pulling operation to vary the stretching of the upper.

The features of the present invention which deal primarily with the tacking mechanism and with the combination therewith of the novel work positioning devices herebefore described and explained, are not claimed herein but form the subject matter of a divisional application Serial No. 624,983 filed May 4, 1911.

Having explained the nature of this invention and fully described a machine embodying the same in the best form now known to me, I claim as new and desire to secure by Letters Patent of the United States:

1. An organized machine for step by step lasting, having in combination, a single gripper arranged to extend transversely across a shoe bottom to engage an upper on the side of the shoe more remote from the machine, and operating mechanism to move the gripper inwardly for pulling the upper toward the machine.

2. An organized machine of the class described, having in combination, a gripper arranged to extend transversely across a shoe bottom to engage an upper on the side of the shoe more remote from the machine; operating mechanism to cause the gripper to pull the upper over the edge of the last and inwardly toward the machine; and a shoe bottom rest which is arranged to resist all of the upper pulling strain of the gripper.

3. An organized machine of the class described, having in combination, a gripper arranged to extend transversely across a shoe bottom to engage an upper on the side of the shoe more remote from the machine; operating mechanism to cause the gripper to pull the upper inwardly toward the machine; and a rest which is arranged to engage the shoe bottom between the gripping point and the body of the machine for the purpose described.

4. A machine for use in the manufacture of boots and shoes, having in combination, a tacker, a gripper and operating mechanism therefor, said machine being organized to permit the gripper to transfer the shoe into tack receiving position and then to pull the upper into position to be fastened by the tacker.

5. A machine for use in the manufacture of boots and shoes, having in combination, a tacker; a gripper and a sole rest and operating devices therefor to effect overworking of an upper; and a gage mechanism which in its operative relation to the tacker occupies the position normally occupied by the gripper to the exclusion of said gripper; said machine being organized to permit either the gripper and sole rest or the gage to coöperate with the tacker.

6. A machine for use in the manufacture of boots and shoes, having in combination, a tacker; a gripper and operating devices therefor to effect overworking of an upper, said gripper being movable into and out of operative position, a locking device to secure said gripper in operative position; and a gage device having provision for retaining it in operative relation to the tacker; said machine being organized to permit either the gripper or the gage device to be brought into operative relation to the tacker.

7. A machine for use in the manufacture of boots and shoes, having in combination, a tacker; a gripper and a sole rest and operating devices therefor to effect overworking of an upper, and a gage mechanism comprising thick and thin spacing blocks; said machine having provision for detachably securing either the gripper and rest or the gage mechanism alternatively in operative relation to the tacker.

8. A machine for use in the manufacture of boots and shoes, having in combination, a tacker; a gripper and operating devices therefor to effect overworking of an upper; and an upper and heel stiffener bender; said gripper and bender being each arranged for movement into and out of operative relation to permit either the gripper or the bender to be employed to position the upper materials for the tacker to fasten them.

9. In a machine for use in the manufacture of boots and shoes the combination with a tacker, of a gripper adapted for working upper materials of one portion of a shoe into position to be secured by the tacker, and a bender adapted for overturning and holding upper material of another portion of the shoe in position to be fastened by the tacker, said machine being organized to permit the gripper or the bender to coöperate alternatively with the tacker to the exclusion of the other of said parts.

10. In a machine for use in the manufacture of boots and shoes the combination with a tacker, of a gripper for use in overworking an upper at the sides of a shoe into position to be secured by the tacker, and a bender for positioning the upper at the heel of the shoe for the tacker to secure it, said gripper and bender being mutually exclusive, each of the other, from operative relation to the tacker.

11. In a machine for use in the manufacture of boots and shoes, in combination, a machine frame, a stationary tacker therein having a driver, and a gripper movable to pull the upper transversely across the driver path from the outer side of the tacker inwardly toward the machine frame.

12. In a machine for use in the manufacture of boots and shoes, in combination, a machine frame, a tacker having a driver, a gripper, means for actuating the gripper relatively to the tacker to pull the upper from the outer side of the shoe across the path of the tacker toward the inner side of the shoe and the machine frame.

13. In a machine for use in the manufacture of boots and shoes, in combination, a machine frame, a tacker having a driver, a gripper, and supporting means in which the gripper is movable relatively to the tacker transversely across the driver path to overdraw the upper from the outer side of the shoe toward the inner side and the machine frame.

14. In a machine for use in the manufacture of boots and shoes, in combination, a machine frame, a gripper, means for supporting said gripper, and a shoe rest projecting outwardly and downwardly to engage the bottom of a shoe presented bottom upward, said parts being constructed and arranged to permit the gripper to engage and pull the upper of the shoe on the side of the shoe more remote from the machine frame.

15. In a machine for use in the manufacture of boots and shoes, a horizontally stationary tacker having a vertical driver path, a shoe rest, a gripper, and means for actuating the gripper to position the shoe relatively to the tacker and pull the upper transversely of the driver path from the outer side of the shoe toward the inner side.

16. In a machine for use in the manufacture of boots and shoes, a tacking mechanism, a gripper constructed and arranged to engage the upper of a shoe at a point removed from the tacking mechanism and actuating mechanism to cause the gripper to move the shoe into position for the insertion of a tack in the upper adjacent to the portion of the upper held by the gripper, and shoe resting means arranged to permit such movement of the shoe.

17. In a machine for use in the manufacture of boots and shoes a tacker which is restrained from forward and backward movements and has a vertical driver path, a gripper having an overdraw movement across the driver path from front to rear and connected operating mechanism for said parts.

18. In a machine for use in the manufacture of boots and shoes a tacker which is restrained from forward and backward movements and has a vertical driver path, a gripper having an overdraw movement across the driver path from front to rear, connected operating mechanism for said parts, and a shoe rest arranged to form a lateral abutment for the shoe during the overdrawing movement of the gripper.

19. In a machine for use in the manufacture of boots and shoes, a tacking mechanism which is restrained from forward and backward movement and includes a driver and operating means therefor, a gripper and means to impart to the gripper overdrawing movement in a plane substantially perpendicular to the driver path.

20. In a machine for use in the manufacture of boots and shoes, a tacking mechanism, a gripper and a sole rest mounted for movement from and toward operative relation to the tacker, a spacing block and an upper bending device also mounted for movement from and toward operative relation to the tacker, said machine having provision for maintaining either of said parts in operative relation.

21. A machine for use in the manufacture of boots and shoes, having in combination, a tacker; a gripper and operating devices therefor to effect overworking of an upper, said gripper being movable into and out of operative position, and a locking device to secure said gripper in operative position.

22. A machine for use in the manufacture of boots and shoes, having in combination, a tacker restrained from inward and outward movement and including a driver and operating means therefor, a sole rest movable transversely of the driver path, a gripper movable transversely of the driver path, and actuating means by which the gripper can move the sole rest in company therewith for a limited distance and then pull the upper into position to be fastened by the tacker.

23. A machine for use in the manufacture of boots and shoes, having in combination, a gripper arranged to extend across the shoe and pull the upper from the outer side of the shoe inwardly toward the body and a sole rest extending across the shoe bottom and formed to engage the sole near its edge to resist overdrawing movement of the gripper.

24. A machine for use in the manufacture of boots and shoes, having in combination, a gripper extending across the shoe and actuating mechanism to cause the gripper to seize the upper of one side of the shoe and move toward the body of the machine for pulling the upper, and a sole rest arranged to engage the shoe bottom on the side adjacent to the portion of upper seized by the grippers to resist displacement of the shoe by the action of the gripper.

25. A machine for use in the manufacture of boots and shoes, having in combination, a gripper, a shoe rest, and means to actuate the gripper to seize the upper, then transfer the shoe and then pull the upper with relation to the rest.

26. A machine for use in the manufacture of boots and shoes, having in combination, a gripper, a tacker, means to actuate the gripper to seize the shoe upper, then transfer the shoe into tack receiving relation to the tacker and then to pull the upper and hold it under tension in position to be tacked.

27. A machine for use in the manufacture of boots and shoes, having in combination, a tacker, a gripper which is shiftable out of and into working relation to the tacker, and gripper actuating means with which operative connection is broken by so shifting the gripper.

28. A machine for use in the manufacture of boots and shoes, having in combination, a tacker, a gripper which is shiftable out of and into working relation to the tacker, gripper actuating means with which operative connection is broken by so shifting the gripper, and means for maintaining the parts of the gripper in relative position to reëstablish operative connection with the actuating means when the gripper is returned to working relation to the tacker.

29. A machine for use in the manufacture of boots and shoes, having in combination, a gripper arranged to extend across the bottom of a last which is presented between the gripper and the body of the machine, means for actuating the gripper to seize and draw the upper over the last bottom, and means engaging the last bottom to resist displacement of the last during the upper stretching movement of the gripper.

30. A machine for use in the manufacture of boots and shoes, having in combination, a gripper comprising parallel bars arranged to extend across the bottom of a last and having upper seizing jaws, means for actuating said bars relatively to seize the upper and further to draw the upper, and a rest arranged to engage the shoe sole for resisting lateral displacement of the last by the overdrawing movement of the gripper.

31. A machine for use in the manufacture of boots and shoes, having in combination, a gripper carrier, an upper jaw, a lower jaw, means for actuating the upper jaw in a right line direction first to grip the stock against the lower jaw and then to move the lower jaw therewith and relatively to the carrier for drawing the stock over the last, and a shoe rest.

32. A machine for use in the manufacture of boots and shoes, having in combination, a gripper carrier, parallel bars movably mounted therein, jaws on the bars, yielding means arranged to press the jaws together, actuating means arranged to control said yielding means and to move the jaws after closure to pull the shoe upper, and a last rest.

33. A machine for use in the manufacture of boots and shoes, having in combination, a frame, gripper bars having jaws at their outer ends and mounted for horizontal endwise movement relatively to seize the upper and then longitudinally together in the same direction to draw the upper over the last, and shoe resting means arranged to require the presentation of the shoe under the bars.

34. A machine for use in the manufacture of boots and shoes, having in combination, a frame, gripper bars having jaws at their outer ends and mounted for horizontal endwise movement to seize and draw the upper inwardly over the last from that side of the shoe that is the more remote from the machine, and a sole rest arranged to engage the shoe bottom for preventing displacement of the last by the upper drawing movement.

35. A machine for use in the manufacture of boots and shoes, having in combination, gripper bars having rigidly attached jaws and mounted for horizontal endwise movement across the last bottom first relatively to seize the upper at the side of the last more remote from the machine and then together to draw the upper inwardly across the last and toward the body of the machine, and means to resist inward displacement of the last by the overdrawing movement of the gripper.

36. A machine for use in the manufacture of boots and shoes, having in combination, a frame, gripper bars having jaws at their outer ends and mounted for horizontal endwise movement relatively to seize the upper and then longitudinally together in the same direction to draw the upper over the last, a stationary tacker, and means to rest the shoe against the pull of the gripper and position the shoe relatively to the tacker.

37. A machine for use in the manufacture of boots and shoes, having in combination, a frame, gripper bars having jaws at their outer ends and mounted for horizontal endwise movement relatively to seize the upper and then longitudinally together in the same direction to draw the upper over the last, a stationary tacker, and means mounted for movement to guide the shoe into a predetermined relation to the tacker and thereafter to resist displacement of the shoe from such relation by the gripper prior to the completion of the upper pulling operation.

38. A machine for use in the manufacture of boots and shoes, having in combination, a gripper arranged to extend across a last bottom and pull an upper from the side of the shoe more remote from the machine, and a rest arranged to engage the shoe bottom between the gripper jaws and the machine.

39. A machine for use in the manufacture of boots and shoes, having in combination, a gripper arranged to extend across a last bottom and pull an upper from the side of the shoe more remote from the machine, and a rest formed and arranged to engage the sole in the downwardly and outwardly inclined channel incision adjacent to the pulling point and to hold the shoe against the overdrawing pull of the gripper.

40. A machine for use in the manufacture of boots and shoes, having in combination, a gripper arranged to extend across a last bottom and pull an upper from the side of the shoe more remote from the machine, and a rest mounted to have a limited movement in the direction of pull and to hold the shoe firmly against final upper tightening pull of the gripper.

41. A machine for use in the manufacture of boots and shoes, having in combination, a gripper arranged to extend across a last bottom and pull an upper from the side of the shoe more remote from the machine, a rest arranged for movement with the gripper during a portion of the movement of the latter, and means for stopping the movement of the rest before the pulling movement of the gripper is completed.

42. A machine for use in the manufacture of boots and shoes, having in combination, a gripper, means for actuating it to seize and pull an upper, and a shoe rest which is mounted to have a limited movement in the direction of the pull of the gripper.

43. A machine for use in the manufacture of boots and shoes, having in combination, a gripper, means for actuating it to seize and pull an upper, and a shoe rest which is mounted to have a limited movement in the direction of the pull of the gripper, yielding means against which such movement takes place and additional means to check such movement at a predetermined point.

44. A machine for use in the manufacture of boots and shoes, having in combination, a gripper having upper seizing and overdrawing movements, an upper fastening mechanism, a sole rest mounted to yield in the direction of the overdrawing movement, and means to stop the rest and shoe when the portion engaged by the rest reaches a predetermined relation to the fastening mechanism.

45. A machine for use in the manufacture of boots and shoes, having in combination, a gripper having upper seizing and overdrawing movements, a tacker, a yielding sole rest, and means to stop the rest with the shoe edge in predetermined relation to the tacker, said machine having provision for adjustment to vary said relation in which the shoe will be stopped.

46. A machine for use in the manufacture of boots and shoes, having in combination, a gripper having upper seizing and overdrawing movements, a sole rest mounted to yield in the direction of the overdrawing movement, and a tacker relatively to which said parts move and position the shoe for tacking.

47. A machine for use in the manufacture of boots and shoes, having in combination, a gripper having upper seizing and overdrawing movements, a yielding sole rest formed to enter the channel incision in the sole and which normally occupies a shoe receiving position relatively to the gripper for the operator conveniently to apply the shoe thereto, and is mounted to permit movement thereof by the shoe for positioning the upper in the gripper.

48. A machine for use in the manufacture of boots and shoes, having in combination, a gripper having upper seizing and overdrawing movements, a tacker, a yielding sole rest formed to enter the channel incision in the sole and which normally occupies a shoe receiving position relatively to the gripper to facilitate the application of the shoe thereto and is mounted to permit movement thereof by the shoe for presenting the upper to the gripper and for further movement with the gripper to position the shoe relatively to the tacker.

49. A machine for use in the manufacture of boots and shoes, having in combination, a gripper having upper seizing, shoe transferring, and overdrawing movements, a tacker, a sole rest normally occupying a shoe receiving position and having a movement with the shoe limited to less than the shoe transferring and overdrawing movements of the gripper.

50. A machine for use in the manufacture of boots and shoes, having in combination, a gripper, a shoe rest, a tacker and mechanism for operating said devices in timed relation to seize an upper, transfer the shoe relatively to the tacker, pull the upper and then insert a tack.

51. A machine for use in the manufacture of boots and shoes, having in combination, a gripper, a shoe rest, a tacker and mechanism for operating said devices in timed relation to seize an upper, transfer the shoe relatively to the tacker, pull the upper, insert a tack and then return the shoe to starting position.

52. A machine for use in the manufacture of boots and shoes, having in combination, a gripper, means for moving it from an upper seizing position to an overdrawing position, a shoe rest yieldingly mounted for movement with the gripper by the work from a shoe receiving position into work resting position and means for positively returning the rest toward starting position.

53. A machine for use in the manufacture of boots and shoes, having in combination, a gripper having upper seizing and overdrawing movements, a shoe rest having a movement inwardly toward the body of the machine from shoe receiving position and in the direction of the overdrawing movement, and means for positively moving the rest reversely.

54. A machine for use in the manufacture of boots and shoes, having in combination, the gripper bars 30, 40 provided with coöperating jaws and mounted for sliding movement relatively and together, the operating bar 45 connected with the bar 40, the spring 32 connecting said bars and tending to close the jaws, and the adjustable stop 36 for limiting the movement produced by the spring, and a tacker to fasten the upper.

55. A machine for use in the manufacture of boots and shoes, having in combination, the gripper bars 30, 40 provided with coöperating jaws and mounted for sliding movement relatively and together, the closing spring 32 connecting the bars, the adjustable stop 36 arranged to limit the closing movement of the jaw bar 30, and the bar 45 connected with jaw bar 40 and operating to permit movement of bar 40 to close the jaws and to effect movement of the bars together in the same direction to pull the upper.

56. A machine for use in the manufacture of boots and shoes, having in combination, the gripper bars 30, 40 mounted for sliding movement relatively and then together in the same direction to seize and then pull an upper, the bar 30 having an inclined upper end face and said bar 40 being bent downwardly over said inclined face to form gripping jaws, means for actuating said bars to seize and pull an upper, and means for fastening the pulled upper.

57. A machine for use in the manufacture of boots and shoes, having in combination, with suitable operating mechanism, a gripper which is permanently connected with the machine and can be shifted into and out of operative relation to said mechanism for discontinuing its actuation at times while the operating mechanism continues to run.

58. A machine for use in the manufacture of boots and shoes, having in combination with suitable operating mechanism, a gripper which is movable into and out of operative relation to said mechanism, and means for locking the gripper in operative position.

59. A machine for use in the manufacture of boots and shoes, having in combination with suitable operating mechanism, a tacker, and a gripper which is movable out of operative relation to the operating mechanism and the tacker during repeated operations of said mechanism and the tacker.

60. A machine for use in the manufacture of boots and shoes, having in combination with suitable operating mechanism, a stationary tacker, and a gripper which is adapted to pull the upper into position to be tacked and which is removable from operative relation to the tacker to expose the tacker for unobstructed use.

61. A machine for use in the manufacture of boots and shoes, having in combination with suitable operating mechanism, a tacker, and a gripper carrier which is supported at a point remote from the tacker, and a gripper therein which is removable with said carrier relatively to said supporting point to expose the tacker for repeated use without the gripper.

62. A machine for use in the manufacture of boots and shoes, having in combination, a tacker, a gripper carrier which is detachably supported adjacent to the tacker and is pivotally supported at its other end for movement away from the tacker, and a gripper in said carrier.

63. A machine for use in the manufacture of boots and shoes, having in combination, a tacker, a pivotally supported gripper carrier, a gripper in the carrier and movable therewith from and toward operative relation to the tacker, and actuating means for the gripper with which it is automatically disconnected when moved out of operative position.

64. A machine for use in the manufacture of boots and shoes, having in combination, the tacker, the gripper and the gripper carrier, the locking bolt 25 for holding the carrier in operative position, and the springs, substantially as described, for causing said bolt to hold the carrier firmly while the bolt is in one position and for retracting said bolt when it is turned into a different angular position.

65. A machine for use in the manufacture of boots and shoes, having in combination, the tacker, the gripper and the gripper carrier, the operating bar having interlocking engagement with the gripper and from and toward which the gripper is movable and the roll 50 and spring 51 to maintain the position of the bar while the grippers are away from it.

66. A machine for use in the manufacture of boots and shoes, having in combination, a tacker, a gripper comprising relatively movable jaws, an operating member with which the gripper is detachably connected, a spring for closing the jaws, and means for locking the jaws in relative position while they are disengaged from the operating member.

67. A machine for use in the manufacture of boots and shoes, having in combination, a tacker, a gripper comprising relatively movable jaws, an operating member with which the gripper is detachably connected, a spring for closing the jaws, and means for locking the jaws in relative position while they are disengaged from the operating member, said machine having provision for automatically unlocking said jaws when they are again secured in operative relation with said member.

68. A machine for use in the manufacture of boots and shoes, having in combination, a stationary tacker, a gripper comprising upper and lower jaws movable relatively to the tacker, said upper jaw having a recess which is elongated in the direction of movement of the jaw and through which the tacker extends.

69. A machine for use in the manufacture of boots and shoes, having in combination, a tacker, and a gripper that extends across the lower end of the tacker into gripping position and is movable rearwardly under the tacker to pull the upper and hold it in position to be tacked.

70. A machine for use in the manufacture of boots and shoes, having in combination, a tacker, and a sole rest and a gripper that extend under the delivery end of the tacker into shoe receiving position and are displaceable relatively to the tacker for pulling the upper and holding the work to receive a tack from the tacker.

71. A machine for use in the manufacture of boots and shoes, having in combination, a tacker, a gripper, and means for actuating said parts, said gripper being arranged for removal from its normal location in the machine into a position remote from the tacker to permit the use of the tacker alone.

72. A machine for use in the manufacture of boots and shoes, having in combination, a tacker, and a gripper which is movably supported at a point remote from the tacker and detachably supported at a point nearer the tacker whereby it can be removed from proximity to the tacker to permit independent use of the tacker.

73. A machine for use in the manufacture of boots and shoes, having in combination with suitable operating mechanism, the locking bolt 25, the gripper pivotally supported on the pin 21 and detachably held in operative position by the locking bolt 25, substantially as described.

74. A machine for use in the manufacture of boots and shoes, having in combination, lasting means and shoe bottom resting means normally projecting into shoe receiving position and yieldingly supported at the beginning of the machine's operation for movement by the shoe into position for the shoe to be operated upon.

75. A machine for use in the manufacture of boots and shoes, having in combination, lasting and tacking mechanisms, shoe resting means, yieldingly held normally in an extended shoe receiving position, and a stop to limit inward movement with relation to said mechanisms.

76. A machine for use in the manufacture of boots and shoes, having in combination, lasting means and shoe resting means comprising a slender endwise movable blade arranged to extend across the shoe bottom and having a downwardly inclined end shaped to enter the channel incision of the sole, substantially as described.

77. A machine for use in the manufacture of boots and shoes, having in combination, a gripper comprising a lower jaw arranged to extend between the upper and the sole and an upper jaw to overlie the stock, means for actuating the jaws to overdraw the upper, a sole rest which is inwardly movable with the shoe preparatory to the operation of the tacker, and means for actuating the sole rest forwardly to move the shoe out of the way of the lower jaw during its return movement.

78. A machine for use in the manufacture of boots and shoes, having in combination, a tacker, a gripper which pulls upon the upper to effect inward movement of the shoe relatively to the tacker, and a rest which acts upon the sole to effect reverse movement of the shoe.

79. A machine for use in the manufacture of boots and shoes, having in combination, a tacker, and a lasting device and a gage which are adapted to occupy alternatively an operative relation to the tacker.

80. A machine for use in the manufacture of boots and shoes, having in combination, a tacker, and a gripper which can be swung into or out of position to coöperate with the tacker.

81. A machine for use in the manufacture of boots and shoes, having in combination, a horizontally stationary tacker, and a gripper comprising jaws having gripping faces at opposite lateral sides of the tacker and operating to draw the upper under the tacker and hold it while a tack is inserted to fasten the upper.

82. A machine for use in the manufacture of boots and shoes, having in combination, the shoe rest and the gripper carrier 20 pivotally supported at one end and detachably held at the other end to the frame by means comprising the spring retracted bolt 25 having a stud and adapted to extend through an opening in the carrier, a seat in the face of the carrier for retaining the stud in holding position, and a seat in the frame to receive the stud and hold the bolt against loose movement while in its inoperative position.

83. A machine for use in the manufacture of boots and shoes, having in combination, the shoe rest and the gripper carrier, and means for detachably supporting the same upon the frame comprising a bolt having a locking stud to extend through and confine the carrier, a stiff spring of short expansion arranged about the frame and one portion of the bolt tending to retract the bolt and thereby to bind the stud against the carrier, and a second spring of greater expansibility arranged between the frame and another portion of the bolt to withdraw the bolt into the frame, substantially as described.

84. A machine for use in the manufacture of boots and shoes, having in combination, a shoe rest and a stationary gripper carrier, an operating bar, a jaw bar connected with the operating bar, a jaw bar having a pin and slot connection with the carrier, a spring tending to close the jaws, and means actuating the operating bar to move the closed jaws together toward one limit of the pin and slot connection with the carrier and then further to move, for opening the jaws, that bar which is directly connected therewith.

85. A machine for use in the manufacture of boots and shoes, having in combination, a shoe rest and a stationary gripper carrier, an operating bar, a jaw bar connected with the operating bar, a jaw bar having a pin and slot connection with the carrier and a spring tending to close the jaws, and means actuating the operating bar to move the jaw directly connected therewith toward the other jaw to close the jaws and then to move the two jaws together relatively to said pin and slot connection to draw the upper held by the jaws.

86. A machine for use in the manufacture of boots and shoes, having in combination, a tacker, a gripper carrier, an operating member, a jaw connected with said member, a jaw having a sliding connection with the carrier, means for actuating said member to move the jaws together toward gripping position, and adjustable means for stopping the second mentioned jaw while the movement of the other jaw is continued.

87. A machine for use in the manufacture of boots and shoes, having in combination, a tacker, a gripper comprising jaws movable relatively to one another and relatively to the tacker, means for operating the jaws, and means for adjustably determining the open relation of one of the jaws to the tacker.

88. A machine for use in the manufacture of boots and shoes, having in combination, a tacker, a gripper, a sole rest, and means for relatively actuating said parts to move an inverted shoe horizontally under the tacker to receive the tack while the grippers pull the upper, and then positively to return it to starting position before the grippers release the upper.

89. A machine for use in the manufacture of boots and shoes, having in combination, a tacker, and a gripper arranged to space the work away from the tacker while the tack is being driven and thereby to cause the tack to be left upstanding from the shoe.

90. A machine for use in the manufacture of boots and shoes, having in combination, a tacker, a gripper movable into and out of working relation to the tacker and arranged when in working position to space the work away from the tacker and cause the tacks to be left upstanding from the face of the work, and a spacing block to hold the work away from the tacker when the gripper is inoperative.

91. A machine for use in the manufacture of boots and shoes, having in combination, a tacker, and a gripper and a spacing block which are movably supported relatively to the tacker and are arranged to be positioned alternatively in operative relation to the tacker.

92. A machine for use in the manufacture of boots and shoes, having in combination, a tacker, and a gripper and a spacing block which are arranged to be positioned alternatively in operative relation to the tacker, said spacing means having provision for adjustment to cause the tacks to be left upstanding to different extents from the surface of the work.

93. A machine for use in the manufacture of boots and shoes, having in combination, a tacker, and a gripper and a work positioning member which are mounted to occupy alternatively a position under the tacker and to space the work relatively to the tacker to limit the insertion of the tacks.

94. A machine for use in the manufacture of boots and shoes, having in combination, a tacker, a gripper adapted to position the work relatively to the tacker to limit the insertion of the tack and shiftable into and out of working relation to the tacker, and a gaging member capable of being positioned, while the gripper is inoperative, into a relation to the tacker to limit the insertion of the tacks.

95. A machine for use in the manufacture of boots and shoes, having in combination, a tacker, a gripper, and means for actuating the gripper to seize the upper of a shoe, pull the upper and move the shoe bodily into tack receiving relation to the tacker.

96. A machine for use in the manufacture of boots and shoes, having in combination, a tacker, a gripper, and means for actuating the gripper to seize the upper of a shoe, pull the upper and move the shoe bodily into tack receiving relation to the tacker, and additional means for reversely moving the shoe.

97. A machine for use in the manufacture of boots and shoes, having in combination, a lasting gripper, a sole rest and a tacker and having provision for shifting the gripper and the sole rest away from the tacker to permit unobstructed access to the tacker.

98. A machine for use in the manufacture of boots and shoes, having in combination, a lasting gripper, a sole rest, a tacker, and operating mechanism for each of said devices, said machine having provision for shifting the rest and its operating means relatively to discontinue the actuation of the rest.

99. A machine for use in the manufacture of boots and shoes, having in combination, a gripper, a shoe rest movable from shoe receiving position into position to form an abutment for the shoe against which the gripper may pull the upper, means for actuating the gripper, and means for returning the rest to starting position substantially in the direction of the longitudinal axis of the rest.

100. A machine for use in the manufacture of boots and shoes, having in combination, a gripper, and a sole rest which normally extends into a shoe receiving position and is movable with and by the shoe to position the shoe for the operation of the gripper.

101. A machine for use in the manufacture of boots and shoes, having in combination, a gripper, a shoe rest which normally extends into a shoe receiving position adjacent to the gripper and is movable inwardly to facilitate placing the work in the gripper, and means to return the rest to shoe receiving position.

102. A machine for use in the manufacture of boots and shoes, having in combination, a tacker including a driver and means to actuate the driver, a sole rest movable during the machine's operation from and toward the tacker, substantially perpendicularly to the driver path and a gripper to pull the upper into position to be tacked.

103. A machine for use in the manufacture of boots and shoes, having in combination, a gripper and a sole rest arranged to move in company and then relatively and means for adjustably limiting the movement of the rest.

104. A machine for use in the manufacture of boots and shoes, having in combination, a tacker, a gripper jaw adapted to occupy a work receiving position under the tacker and movable out of the path of the tack from the tacker, said jaw being provided with a recess through which a tack may be driven.

105. A machine for use in the manufacture of boots and shoes, having in combination, a relatively stationary tacker, and gripper jaws which are forked to straddle the tacker and are movable relatively thereto for pulling the upper.

In testimony whereof I have signed my name to this specification in the presence of two subscribing witnesses.

ORRELL ASHTON.

Witnesses:
ARTHUR L. RUSSELL,
ELIZABETH C. COUPE.